(12) United States Patent
Vetterli et al.

(10) Patent No.: US 8,451,921 B2
(45) Date of Patent: May 28, 2013

(54) METHOD AND AN APPARATUS FOR ADAPTIVELY LEARNING A SPARSE IMPULSE RESPONSE OF A CONTINUOUS CHANNEL

(75) Inventors: Martin Vetterli, Grandvaux (CH); Yue Lu, Cambridge, MA (US); Martin McCormick, Oregon, IL (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 12/912,524

(22) Filed: Oct. 26, 2010

(65) Prior Publication Data

US 2011/0096811 A1  Apr. 28, 2011

Related U.S. Application Data

(60) Provisional application No. 61/255,765, filed on Oct. 28, 2009.

(51) Int. Cl.
*H04K 1/10* (2006.01)
*H04L 12/66* (2006.01)
*G11B 5/33* (2006.01)

(52) U.S. Cl.
USPC .......................... 375/260; 370/352; 428/812

(58) Field of Classification Search
USPC .......................................... 375/260; 370/352
See application file for complete search history.

(56) References Cited

U.S. PATENT DOCUMENTS

| | | | | |
|---|---|---|---|---|
| 5,513,180 A | * | 4/1996 | Miyake et al. | 370/352 |
| 5,548,681 A | * | 8/1996 | Gleaves et al. | 704/233 |
| 5,848,151 A | * | 12/1998 | Boudy et al. | 379/406.13 |
| 5,932,341 A | * | 8/1999 | Endo et al. | 428/327 |
| 6,054,185 A | * | 4/2000 | Inspektor | 427/419.7 |
| 6,057,628 A | * | 5/2000 | Viljoen et al. | 310/311 |
| 6,110,609 A | * | 8/2000 | Hiramoto et al. | 428/812 |
| 6,240,622 B1 | * | 6/2001 | Ahn et al. | 29/604 |
| 6,259,680 B1 | | 7/2001 | Blackwell et al. | |
| 6,383,585 B2 | * | 5/2002 | Peiffer et al. | 428/35.9 |
| 6,446,327 B2 | * | 9/2002 | Ahn et al. | 29/604 |
| 2001/0045931 A1 | * | 11/2001 | Koyama et al. | 345/92 |
| 2003/0118177 A1 | * | 6/2003 | Karakas et al. | 379/406.01 |
| 2009/0068974 A1 | * | 3/2009 | Smith | 455/304 |

FOREIGN PATENT DOCUMENTS

| WO | WO2004086792 | * 10/2004 |
|---|---|---|
| WO | WO2009096995 | 8/2009 |

OTHER PUBLICATIONS

Blu, et al., Sparse Sampling of Signal Innovations, 2008, IEEE Signal Processing Magazine, vol. 25, Issue: 2, pp. 31-40.
International Search Report and Written Opinion—PCT/US2010/054560—ISA/EPO—Apr. 28, 2011.

(Continued)

*Primary Examiner* — David C. Payne
*Assistant Examiner* — Sarah Hassan
(74) *Attorney, Agent, or Firm* — John G. Rickenbrode

(57) ABSTRACT

A method for adaptively learning a sparse impulse response (100) of a continuous channel to which an input signal ($x(t)$) is applied and which delivers an output signal ($y(t)$), comprising the following steps:
  low-pass filtering the input signal and the output signal and obtain a filtered input signal ($x_F(t)$) and a filtered output signal ($y_F(t)$)
  sampling the filtered input signal and the filtered output signal with a sampling rate below the Nyquist rate and obtaining a sampled input signal ($x_S(t)$) and a sampled output signal ($y_S(t)$)
  retrieving from the sampled input signal ($x_S(t)$) and the sampled output signal ($y_S(t)$) an estimate (400) of the sparse impulse response (100) of the continuous channel.

21 Claims, 2 Drawing Sheets

OTHER PUBLICATIONS

Maravic I et al: "Channel estimation and synchronization with sub-nyquist sampling and application to ultra-wideband systems", Circuits and Systems, 2004., vol. 5, May 23, 2004, pp. 381-384, XP010719536, ISBN: 978-0-7803-8251-0.

Martin McCormick et al: "Learning sparse systems at sub-Nyquist rates: A frequency-domain approach", Acoustics Speech and Signal Processing (ICASSP), Mar. 14, 2010, pp. 4018-4021, XP031697696, IEEE, Piscataway, NJ, USA ISBN: 978-1-4244-4295-9.

Ali H. Sayed, "Adaptive filters", IEEE, 2008, pp. 445-446, A John Wiley & Sons, Inc.

James A. Cadzow, "Signal Enhancement—A Composite Property Mapping Algorithm", IEEE Transactions on Acoustics. Speech and Signal Processing. Jan. 1988, pp. 49-62, vol. 36. No. 1.

Richard K. Martin et al., "Exploiting Sparsity in Adaptive Filters", IEEE Transactions on Signal Processing, Aug. 2002, pp. 1883-1894, vol. 50, No. 8.

Yilun Chen et al., "Sparse LMS for System Identification", Proceeding ICASSP '09 Proceedings of the 2009 IEEE International Conference on Acoustics, Speech and Signal Processing, 2009, pp. 1-4, IEEE Computer Society.

* cited by examiner

METHOD AND AN APPARATUS FOR ADAPTIVELY LEARNING A SPARSE IMPULSE RESPONSE OF A CONTINUOUS CHANNEL

RELATED APPLICATIONS

This application claims the benefit of U.S. Provisional Application No. 61/255,765, filed on Oct. 28, 2009, which is hereby incorporated by reference in its entirety.

TECHNICAL FIELD

This disclosure relates to a method and an apparatus for adaptively learning a sparse impulse response of a continuous channel.

This method and apparatus can be applied to various situations where an adaptive learning of a sparse impulse response of a continuous channel is required, such as without restrictions in some wireless communication channels, such as e.g. CDMA channels, in acoustic room context, in ultra-wideband ranging and line echo cancellation problems, in transmission systems for optical fibers, in body scan devices, to name a few.

BACKGROUND

In this context the adjective "continuous" when applied to a channel and in particular to its impulse response, means continuous in the time-domain, or continuous-time, i.e. a varying quantity whose domain, in this case the time, is a continuum, e.g. a connected interval of real numbers. In other words, the function's domain is an uncountable set. The impulse response function itself need not be continuous. To contrast, the impulse response of a discrete-time channel has a countable domain, like natural numbers. The impulse response of a discrete-time channel can be obtained by sampling the impulse response of a continuous-time channel.

In each of the above cited applications, the continuous channel is unknown although it is known that it is sparse in time, i.e. it consists of few well localised signals, for example due to echoes in an acoustic room. An example of a continuous sparse channel is a channel whose impulse response h(t) can be modeled as a linear combination of several Diracs, i.e.

$$h(t) = \sum_{k=1}^{K} c_k \delta(t - t_k) \quad (1)$$

where $\{c_k\}_{k=1}^{K}$ and $\{t_k\}_{k=1}^{K}$ are some unknown parameters. K is the sparsity of the channel.

In the context of the one embodiment of the invention the function h(t) is the impulse response of the continuous-time channel. Since a channel can be modeled as a filter, in this context we also refer h(t) as the filter that models the continuous-time channel. Similar considerations are valid for the other cited channel, e.g. the discrete-time channel. An example of an impulse response of the continuous-time channel h(t) is illustrated in FIG. 3, which will be discussed later.

It is often wanted to learn this unknown continuous sparse channel by building an estimate of this filter h(t). Since the channel is changing in time, it is often necessary to modify this channel iteratively in order to adapt this estimate to the variations of the continuous sparse channel in time.

A possible system comprising an automatic and adaptive channel estimate is illustrated in FIG. 1, which represents a scenario involving hands-free telephony in an acoustic and close room 1. In this figure, s1 represents a known voice signal coming from a party at a remote side of the conversation and played back with a loudspeaker 2. A speaker 4 is speaking by using the microphone 6; s2 represents the acoustic signal which is picked up by the microphone 6. However the microphone 6 picks up also a distorted copy of s1: the distortion is due to the room reverberations and can be modeled as the convolution between s1 and an unknown filter H, indicated with the reference 100 and corresponding to the acoustic channel between the source s1 and the microphone 4. In other words the microphone 6 measures both the speaker voice s2 and the result of above convolution:

$$s_2 + s_1 * H \quad (2)$$

The goal of the system is to transmit to the party at the remote side only the signal s2, so that this party will not hear the echoes $s_1 * H$ of her/his own voice. This task is also known as "acoustic echo cancellation" and it is achieved by using an adaptive filter $\hat{H}$, indicated with the reference 400, which represents an estimate of the unknown filter H 100.

The signal s1 is also the input of the filter $\hat{H}$ 400 and its output is indicated by $\hat{s}_1$. The closer the filter $\hat{H}$ to the unknown filter H, the more $\hat{s}_1$ is equal to $s_1$. For this reason $\hat{s}_1$ is subtracted (reference 50) from the output of the microphone given by the above expression (2): in the ideal case, i.e. in the case wherein the filter $\hat{H}$ exactly reproduced the unknown filter H $$(s_2 + s_1 * H) - \hat{s}_1 = s_2 + s_1 * H - s_1 * \hat{H}^{\hat{H}=H} = s_2 \quad (3)$$

The arrow of the filter $\hat{H}$ 400 in FIG. 1 indicates that it can be iteratively modified in order to adapt $\hat{H}$ to temporal variations of H.

The example of FIG. 1 has been introduced for focusing the problem. However the scope of one embodiment of the invention is not limited to the described example: as already mentioned, the man skilled in the art can imagine other scenarios in which it is necessary to adaptively learn a sparse impulse response of a continuous, almost shift-invariant channel.

Generally speaking, a linear channel that is "almost" shift-invariant, i.e. that is slowly varying in time, is an example of a continuous—and unknown—channel for which it is useful to learn its sparse impulse response. How "slow" a channel varies is relative to the tracking speed of the channel identification methods. In general, the channel should remain roughly constant within N taps, where N is the number of steps taken by an adaptive method for converging to a solution.

Computing a filter estimate $\hat{H}$ is based on linear system identification, which is a classical and well-studied subject. A known method for learning a general sparse impulse response h(t) of a continuous channel can be summarized as follows. x(t) and y(t) are the input and output signal of the unknown continuous channel, respectively. The input x(t) is supposed to be band-limited, so that x(t) and y(t) can be converted into the discrete domain by sampling them at or above the Nyquist rate.

Since the sampling process is alias-free, the resulting discrete signals—denoted by x[n] and y[n] respectively—are also related by a linear shift-invariant system, i.e.

$$y[n] = (x * h_d)[n] \quad (4)$$

The discrete filter $h_d[n]$ above either completely determines the original continuous-time impulse response h(t) if the latter is band-limited and has a bandwidth below that of x(t), or is a low-pass approximation of h(t). In practice, $h_d[n]$ is usually approximated by a finite impulse response (FIR)

filter with N taps, where N is chosen to be large enough to retain most of the energy of $h_d[n]$. In other words after sampling, the discrete filter $h_d[n]$ is approximated by an FIR model, whose length, N, must be large enough to capture the longest possible delay in the system. More specifically:

$$N \approx \frac{\max_k t_k}{T} \qquad (5)$$

where T is the sampling interval. N is generally much larger than the number of delays K that make up the system itself.

This finite-order system can then be learned from x[n] and y[n] by using standard adaptive filtering techniques, such as the least mean squares (LMS) algorithm.

Despite its widespread and successful use in practice for learning general linear time-invariant systems, the traditional approach described above is computationally expensive, since all the N filter taps have to be determined. Moreover the bandwidth of the input signal x(t) needs to be limited, so that x(t) and y(t) can be converted into the discrete domain by sampling them at or above the Nyquist rate. However there are wide classes of very common signals, including stream of Dirac pulses, bi-level signals, piecewise polynomial signals, etc. which are not band-limited and which cannot be used for estimating the channel with this known method. An example of a system using such no band-limited signals is the CDMA.

Even if the signals are band-limited, their bandwidth is sometime very large, so that the current methods requires fast, expensive and power-consuming A/D converter, fast digital circuits and a waste storage place for storing the digitized signals while fulfilling the Nyquist condition. Examples of signals with a large bandwidth that makes them impracticable for the above mentioned methods include UWB signals.

Moreover the known standard adaptive filtering techniques are not efficient, since when either the input signal x(t) or the channel noise is not white, there is no possibility to select the frequency band of the input signal x(t) with the highest SNR (Signal to Noise Ratio).

Known algorithm which adaptively obtains the impulse response of the filter $\hat{H}$ 400 include the Frequency Least Mean Square (FLMS), which operates in the frequency-domain, the Recursive Least Square (RLS) and the reweighted zero attracting method (RZA), both operating in the time-domain. An example of RZA method is given by Y. Chen, Y. Gu, and A. O. Hero, "*Sparse LMS for system identification,*" in Proc. IEEE Int. Conf Acoust., Speech, and Signal Proc., Taipei, 2009. Another LMS sparsity-exploiting method operating in the time domain is given by R. K. Martin, W. A. Sethares, R. C. Williamson, and C. R. Johnson, "*Exploiting sparsity in adaptive filters,*" IEEE Trans. Signal Process., vol. 50, no. 8, pp. 1883-1894, August 2002.

If for comparison purposes the parameters of each algorithm are made equal when possible, the known FLMS, compared to the RLS and the RZA, has the highest Mean-Squared output Error (MSE). The RLS is not efficient to track a change of the unknown filter taps. The RZA is efficient in tracking these changes, it presents a MSE better than a classical FLMS but it is computationally complex and requires a sampling rate above the Nyquist system, i.e. the convergence rate is quite low. Moreover RZA does not handle well the modelling of the sparsity off of the sampling grid since it assume that the discrete channel is exactly K-sparse. However, if the continuous dirac delta (t–t_k) falls on a fractional number (i.e. off the discrete grid), one can see a sinc function in the discrete domain, which is not exactly sparse. Finally RLS and RZA methods are computationally less efficient than frequency domain methods, if block-based processing is used.

WO10083321 describes a method for reconstructing a pair of signals, wherein the first signal is linked to the second signal by an unknown but sparse filter. In this case the sparseness information is used for reconstructing the two signals, but not the filter itself Moreover the method assumes that the unknown channels are constant over time, i.e. it cannot track slowly-varying channels.

A method and an apparatus for adaptively learning a sparse impulse response of a continuous channel which does not necessarily require a band-limited input signal x(t) and with a lower computational complexity than known methods are needed.

A method and an apparatus for adaptively learning a sparse impulse response of a continuous channel which are more efficient in the case when either the input signal x(t) or the channel noise is not white are also needed.

A new FLMS method which is efficient to track a change of the unknown filter taps, which presents a MSE better than a classical FLMS, which is more versatile and less computationally complex than other known method is also needed.

SUMMARY

In general, this disclosure describes techniques for adaptively learning a sparse impulse response of a continuous channel.

The approach described above does not exploit the special sparse structure of the unknown continuous channel. Intuitively, since the impulse response in (1) can be specified by only a small number of parameters, i.e. 2K, one should expect a much more efficient scheme in learning h(t).

By exploiting the sparse structure of the continuous channel, according to one embodiment of the invention it is possible to reduce the sampling rate below the Nyquist rate, and still recover the entire impulse response of h(t). Reducing the sampling rate below the Nyquist rate allows to use less expensive and power-consuming digital circuits and to reduce the storage place for storing the digitized signals. Moreover it is not necessary that the input signal is band-limited, so that the new method can also be used to non band-limited signals, such as CDMA signals.

The sparse system according to one embodiment of the invention can be learned by an estimate, for example an FIR filter, which has roughly the same order as the sparsity level K, where K<<N, e.g. K=12 and N=1024.

The new adaptive FLMS method according to the one embodiment of invention uses a sub-Nyquist sampling step, i.e., a step of sampling a signal at a rate which is below the sampling rate given by Nyquist. The new method is based on the observation that the Fourier transform of the sparse impulse response of a continuous-time channel is a sum of complex exponentials. By borrowing tools from spectral analysis and array signal processing, it is possible to use only a small band of the Fourier transform to recover its frequencies, phases, and amplitude, the collection of which parameterizes the entire channel.

In other words the proposed method allows to select a frequency band of the input signal x(t) with the highest signal to noise ratio (SNR), which is useful in the case when either the input signal x(t) or the channel noise is not white.

According to one example of the invention, the original continuous-time channel can be determined by considering a sampled discrete-time system, whose sampling rate can vary freely below the Nyquist rate. Moreover, with sufficient sub-sampling, this equivalent discrete system can be learned by running LMS for an FIR filter with only 2K taps. Let T be the sampling interval, i.e. 1/T the sampling rate, L the maximum span, i.e. the delay spread in the time domain, of the original continuous filter and N the number of taps of the discrete filter, then N=L/T. By increasing T, i.e. by reducing the sampling rate, it is possible to reduce N until N is roughly equals 2K.

By exploiting the prior knowledge of the complex exponential structure of the continuous channel in the frequency domain, a new frequency-domain LMS (FLMS) method with significantly improved convergence performance can be built. The parameters of the original continuous-time channel can then be recovered by a new method based on different tools known in the field of harmonic retrieval.

In one embodiment, the continuous-time channel is a wireless RF channel and its input output signals are electromagnetic signals.

In one example, a method for adaptively learning a sparse impulse response of a continuous channel to which an input signal is applied and which delivers an output signal includes:

low-pass filtering said input signal and said output signal and obtaining a filtered input signal and a filtered output signal sampling said filtered input signal and said filtered output signal with a sampling rate below the Nyquist rate and obtaining a sampled input signal and a sampled output signal retrieving from said sampled input signal and said sampled output signal an estimate of said sparse impulse response of said continuous channel.

In another example a computer-readable medium, such as a computer-readable storage medium, for adaptively learning a sparse impulse response of a continuous channel to which an input signal is applied and which delivers an output signal, is encoded with instructions that cause a programmable processor to low-pass filter said input signal and said output signal and obtain a filtered input signal and a filtered output signal sample said filtered input signal and said filtered output signal with a sampling rate below the Nyquist rate and obtain a sampled input signal and a sampled output signal retrieve from said sampled input signal and said sampled output signal an estimate of said sparse impulse response of said continuous channel.

In another example, an apparatus for adaptive learning a sparse impulse response of a continuous channel having an input signal and an output signal includes means for low-pass filtering said input signal and said output signal and obtaining a filtered input signal and a filtered output signal means for sampling said filtered input signal and said filtered output signal with a sampling rate below the Nyquist rate and obtaining a sampled input signal and a sampled output signal means for retrieving from said sampled input signal and said sampled output signal an estimate of said sparse impulse response of said continuous channel.

In another example, an apparatus for adaptive learning a sparse impulse response of a continuous channel having an input signal and an output signal includes a low-pass filter arranged to low-pass filter said input signal and said output signal and obtain a filtered input signal and a filtered output signal a sampler arranged to sample said filtered input signal and said filtered output signal with a sampling rate below the Nyquist rate and obtain a sampled input signal and a sampled output signal a calculator configured to retrieve from said sampled input signal and said sampled output signal an estimate of said sparse impulse response of said continuous channel.

In one embodiment the apparatus can be a radio-transmitter comprising also circuits configured to transmit said input signal and receive said output signal.

In one embodiment, the radio-transmitter is a mobile phone.

In another embodiment the apparatus can be an acoustic echo canceller, comprising also circuits configured to cancel the acoustic echo from the continuous-time channel.

In another embodiment the apparatus can be a line echo canceller, comprising also circuits configured to cancel the line echo from the continuous-time channel, e.g. an optical fiber.

The details of one or more examples are set forth in the accompanying drawings and the description below. Other features, objects, and advantages will be apparent from the description and drawings, and from the claims.

DETAILED DESCRIPTION

Figure 1:
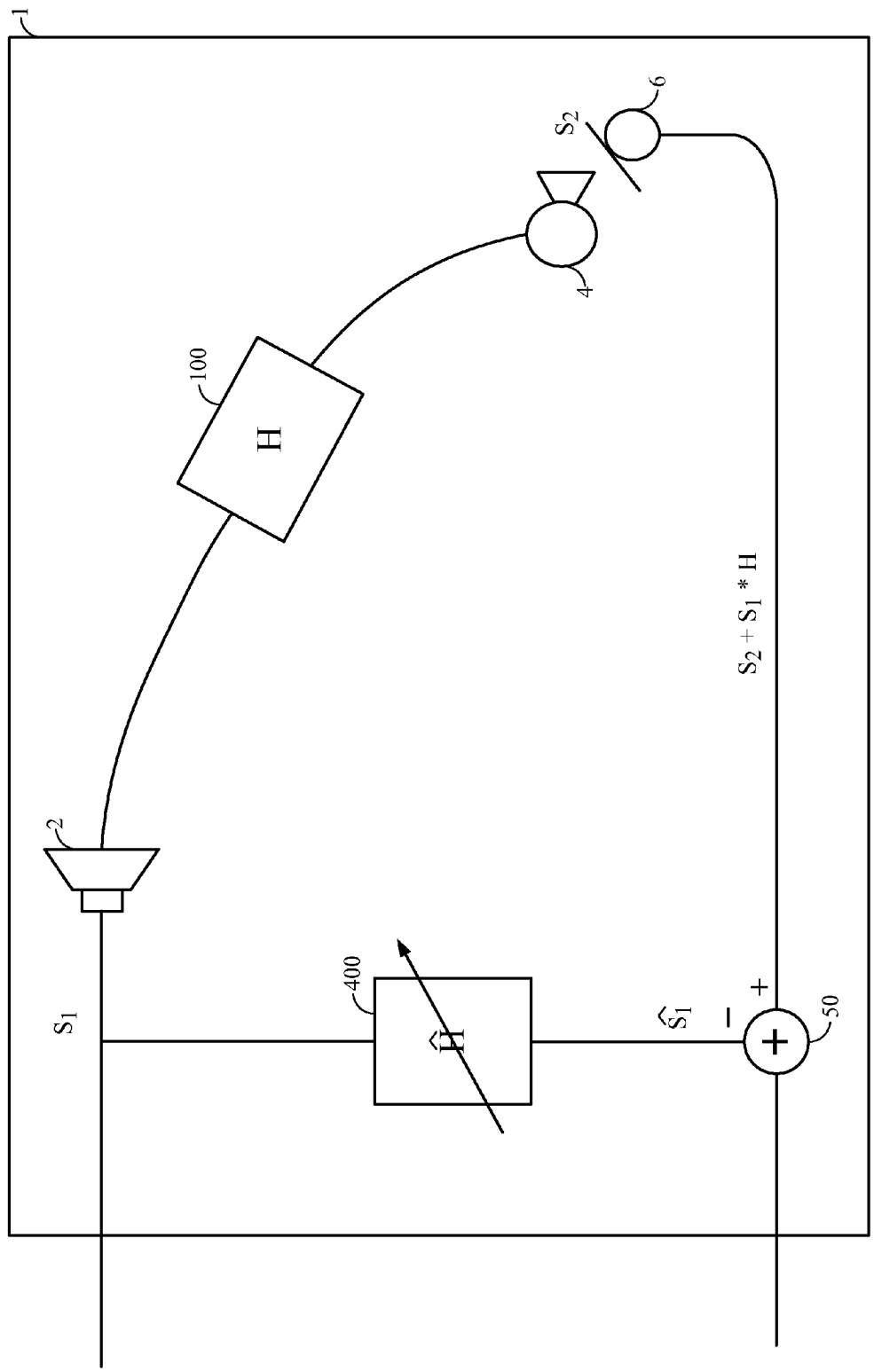
FIG. 1 is a block diagram illustrating an acoustic system.

FIG. 1 is a block diagram illustrating an acoustic system.

Figure 3:
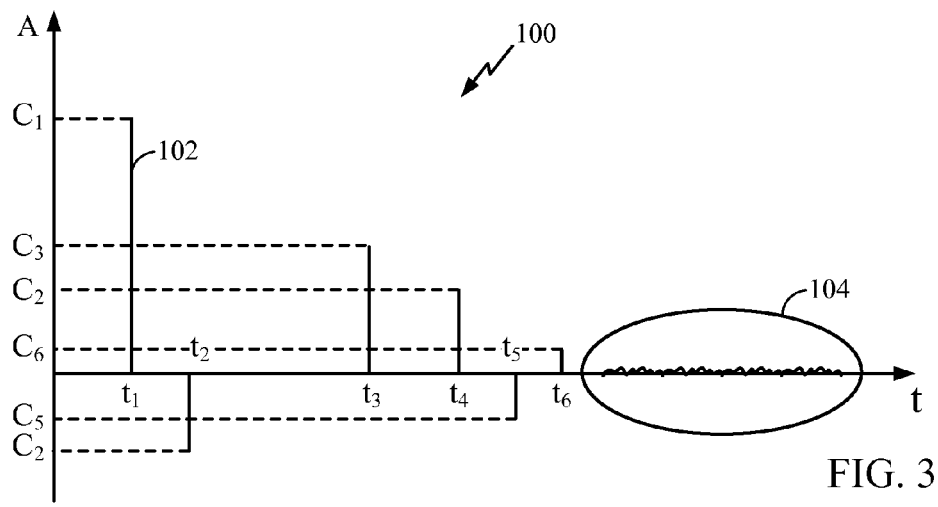
FIG. 3 is a chart illustrating a continuous-time sparse channel.

An example of such impulse response is illustrated in FIG. 3: the first Dirac 102 could correspond for example to the first reflection of an acoustic signal against a first wall of a close acoustic room, the second as the second reflection against a second wall, etc. The last part of the FIG. 3, denoted by the reference 104 and comprising signals having a small amplitude with regard to the Diracs 102, changes fast, while the first part constituted by Diracs 102 slowly changes. In the context of the one embodiment of the invention, only the first part of this impulse response, constituted by a number of Diracs equal to the sparsity K of the channel, is taken into account in the proposed method, and the last part 104 of FIG. 3 is disregarded.

Figure 2:
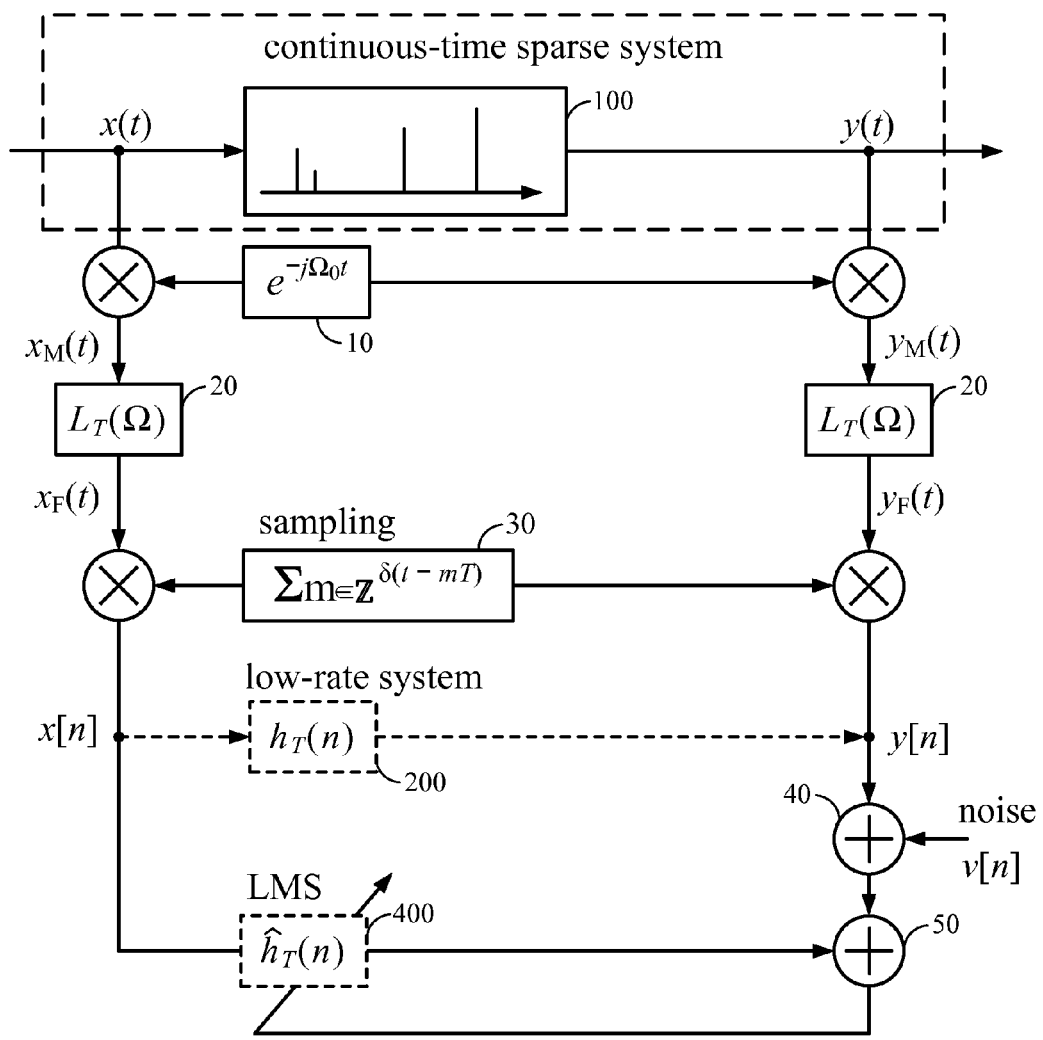
FIG. 2 is a block diagram illustrating a system for adaptive learning a sparse impulse response of a continuous channel.

In FIG. 2 a frequency modulation 10 is applied with a frequency modulator to the input signal x(t) and to the output signal y(t): in the illustrated example these input and output signals are multiplied by $e^{-j\Omega_0 t}$. A frequency modulated input signal $x_M(t)$ and a frequency modulated output signal $y_M(t)$ are then respectively obtained.

In one embodiment these frequency modulated signals are then passed through a low-pass filter 20, defined as $$L(\Omega)=1_{[-\pi/T,\pi/T]}(\Omega) \quad (6)$$

where $1\mathcal{F}(\cdot)$ denotes the indicator function defined on an interval F. The specification of this filter guarantees that there is not aliasing in the next sampling process. The filter 20 can be an electrical or software filter.

Subsequently, the two filtered signals are sampled at a sampling rate 1/T below the Nyquist rate (reference 30 in FIG. 1) in order to obtain a sampled input signal x[n] and a sampled output signal y[n] according to the following definitions $$x_T[n] \stackrel{def}{=} x_F(nT) \text{ and } y_T[n] \stackrel{def}{=} y_F(nT) \quad (7)$$

where $x_F$ and $y_F$ are respectively the filtered input and output signal of in FIG. 2. Those methods can be regarded as a special case of the scheme of FIG. 1, when the modulation frequency $\Omega_0$ is set to 0, the low-pass filter is always present and the sampling rate $1/T$ is equal to the Nyquist rate of the filtered input signal $x_F(t)$.

According to one aspect of the invention, the discrete signals $x_T[n]$ (sampled input signal) and $y_T[n]$ (sampled output signal) are related by a discrete-time filtering operation:

$$y_T[n] = (x_T * h_T)[n] \quad (8)$$

where the filter $h_T[n]$, illustrated by a dashed line in FIG. 2 (reference 200), has a discrete-time Fourier transform $H_T(e^{j\omega})$ given by $$H_T(e^{j\omega}) = \sum_{k=1}^{K} c_k e^{-j\Omega_0 t_k} e^{-j\omega t_k/T} \quad (9)$$

In other words, the estimate in the frequency domain of the unknown continuous channel can be modeled as a filter comprising a sum of complex exponentials. See the appendix A for further details.

The sampled discrete-time channel $h_T[n]$ specified in (8) and (9) can completely determine the original continuous-time sparse channel $h(t)$. See the appendix B for a demonstration.

The proposition of the previous paragraph is valid for an arbitrary choice of $T$ and $\Omega$. Thus, by increasing $T$, the sampling rate for the equivalent discrete-time channel $h_T[n]$ can be set to well below the Nyquist rate. As outlined, reducing the sampling rate below the Nyquist rate allows to use less expensive and power-consuming digital circuits and to reduce the storage place for storing the digitized signals. Moreover it is not necessary that the input signal is band-limited, so that the method can be applied no non band-limited signals, such as CDMA for example.

Additionally, the modulation frequency $\Omega_0$ can be used to select a frequency band of the input signal $x(t)$ with the highest possible signal to noise ratio (SNR). As discussed, this is useful when either the input signal $x(t)$ or the noise is not white.

In FIG. 1 the noise $v[n]$ has been introduced for describing a realistic and no-ideal situation: it is added at element 40 to the output sampled signal $y[n]$.

Learning the Discrete-Time Channel $h_T[n]$

In order to learn the discrete-time channel $h_T[n]$ that, as demonstrated in Appendix B, is equivalent to the continuous-time channel $h(t)$, a new frequency-domain LMS (FLMS) method is used. The idea is to approximate $h_T[n]$, which is of infinite length, by a truncated FIR filter $\tilde{h}_T[n]$. It is possible to show that the discrete Fourier transform (DFT) of this truncated filter $\tilde{h}_T[n]$ an be approximated by a discretized version of the discrete-time Fourier transform (9) of the discrete-time channel $h_T[n]$.

From (9) it follows that the discrete-time channel $h_T[n]$ has the following form:

$$h_T[n] = \sum_{k=1}^{K} c_k e^{-j\Omega_0 t_k} \frac{\sin(\pi(n - t_k/T))}{\pi(n - t_k/T)} \quad (10)$$

Unless the $t_k$ parameters are all integer multiples of T, i.e. the sampling interval, the discrete-time channel $h_T[n]$ of (10) can be modeled as a filter of infinite length. It is then approximated by an FIR filter of length N, where $$N \geq \left\lceil \frac{\max_k (t_k)}{T} \right\rceil + c \quad (11)$$

wherein $\lceil \ \rceil$ indicates the ceiling function and c some constant. Even for relatively small value of c, the above truncated FIR filter, denoted by $\tilde{h}_T[n]$, can capture most of energy of $h_T[n]$. For example c=5 include at least 99% of the energy for the largest $t_k$ in the worst case.

As mentioned the DFT of the truncated filter $\tilde{h}_T[n]$, denoted by $H[m]$, can be approximated by a discretized version of the discrete-time Fourier transform $H_T(e^{j\omega})$ given in (9). An example of this discretized version is $$H_m = \sum_{k=1}^{K} c_k e^{-j\Omega_0 t_k} e^{-j2\pi \frac{t_k m}{TN}} \quad (12)$$

$$m = 0, 1, \ldots, N-1$$

The filter of the formula (12) has a parametric structure, since it depends from the parameters $c_k$ and $t_k$. By increasing the sampling interval T, not only the sampling rate $1/T$ becomes lower and below the Nyquist rate, but also the model order N can be decreased, according to the constraint in (11). As will be discussed, a possible lower bound of N can be $2K+2$.

For learning the truncated FIR filter $\tilde{h}_T[n]$, or equivalently its approximated DFT $\{H_m\}_{m=0}^{N-1}$ given in (11) many type of adaptive filters can be used. The frequency-domain LMS (FLMS) in particular can learn the approximated DFT $\{H_m\}_{m=0}^{N-1}$ directly: at each iteration it finds the filter coefficients that relate to producing the least mean squares of the error signal, e.g. the difference performed by the element 50 in FIG. 1. It is a stochastic gradient descent method in that the filter is only adapted based on the error at the current time. In other words at each iteration, an estimate of $\{H_m\}_{m=0}^{N-1}$ is made by following a gradient descent step. This estimate is indicated by $$\hat{H} = [\hat{H}_0, \ldots, \hat{H}_{N-1}]^T \quad (13)$$

The initial value of this estimate can be a null-vector or any other vectors. The new FLMS according to the one embodiment of the invention exploits the special parametric structure of the filter given by (12). In a first step a Toeplitz matrix A, i.e. a matrix in which each descending diagonal from left to right is constant, is formed according to $$A = \begin{bmatrix} H_L & H_{L-1} & \ldots & H_0 \\ H_{L+1} & H_L & \ldots & H_1 \\ \ldots & \ldots & \ldots & \ldots \\ H_N & H_{N-1} & \ldots & H_{N-L} \end{bmatrix}_{(N-L+1)\times(L+1)} \quad (14)$$

where L is the floor function of N/2, i.e.

$$L = \left\lfloor \frac{N}{2} \right\rfloor.$$

From J. A. Cadzow, "Signal enhancement—A composite property mapping algorithm," IEEE Trans. Acoust., Speech, and Signal Process., vol. 36, no. 1, pp. 49-62, January 1988 it is known that in the noiseless case the rank of A must be equal to K. This known property can be used for accelerating the convergence of the new FLMS method, which can be called Cadzow-FLMS or C-FLMS, as summarized in the following steps.

For each iteration of the new FLMS method or C-FLMS, the current estimate of the approximated DFT of the truncated FIR filter $\tilde{h}_T[n]$ which approximates the discrete-time filter, given in (12), is denoted by $\hat{H}_n$. The new FLMS method or C-FLMS for each iteration is composed by the following steps:

Finding a standard update vector of the C-FLMS, indicated by S, by using for example the method described in Ali H. Sayed, *Adaptive Filters*, John Wiley & Sons, 2008, p. 445 and adding it to a current estimate of the Fourier coefficient $\hat{H}_n$, in order to find the next estimate of the Fourier coefficient $\hat{H}_{n+1}$ according to:

$$\hat{H}_{n+1} = \hat{H}_n + S \quad (15)$$

Building a Toeplitz matrix A from the next estimate $\hat{H}_{n+1}$
In order to enforce the rank condition of A (rank$_A$=K) computing the Singular Value Decomposition (SVD) of the Toeplitz matrix A, which is a particular kind of factorization based on the use of eigen-values and eigen-vectors, used for generating an approximation of the matrix A having a minor rank according to $$A = U\Lambda V^T \quad (16)$$

where
U is an unitary matrix (N−L+1)×(N−L+1)
Λ is a diagonal matrix (N−L+1)×(L+1)
$V^T$ is the conjugate transpose matrix of a unitary matrix (L+1)×(L+1)

Building a diagonal matrix Λ' from the diagonal matrix Λ the SVD by zerogoing all term less than the K most significative, where K is the sparsity of the continuous channel.

Producing a new matrix A' having rank K by using this built diagonal matrix Λ' according to $$A' = U\Lambda' V^T \quad (17)$$

This step allows to build a matrix with a rank equal to the sparsity of the continuous channel and it is important in the context of the one embodiment of the invention, since the method at this step promotes and exploits the sparsity of the continuous channel.

Computing a denoised version C, C being a vector, of the next estimate $\hat{H}_{n+1}$ by averaging the diagonals of the new matrix A'.

Intuitively, this "SVD denoising step" brings the next estimate closer to the model assumption made in the formula (12), i.e. the approximation of the DFT of the truncated filter $\tilde{h}_T[n]$, denoted by H[m], by a discretized version of the discrete-time Fourier transform $H_T[e^{j\omega}]$ given in (9).

Updating the next estimate $\hat{H}_{n+1}$ taking into account the update vector S and the denoised version C according to $$\hat{H}_{n+1} = \hat{H}_n + S + \left(I - \frac{SS^H}{S^H S}\right)(C - \hat{H}_n) \quad (18)$$

where $S^H$ represents the Hermitian conjugate of the update vector S.
The matrix $$\left(I - \frac{SS^H}{S^H S}\right)$$

ensures that the inner product between S and the denoised version C is always positive, which is important in guaranteeing the convergence of the method.

Numerical experiments have shown that the proposed method described above can dramatically improve the convergence rate and the steady state error of the FLMS.

Recovering the Original Continuous-Time Sparse Channel

After finding the approximation H[m] of the DFT of the truncated filter $\tilde{h}_T[n]$, given in (12), according to the previous steps, the final step is to estimate the parameters $c_k$ and $t_k$, which can be used for reconstructing the original continuous-time sparse impulse response h(t).

Different methods can be used for this parameter estimation task. A possible choice can be the following, which is called the Prony's method:

From the Fourier coefficient $\{\hat{H}_m\}_{m=0}^{N-1}$ learned by the previous steps forming the Toeplitz matrix A as in (14). In this case the parameter L has to be set equal to K.

Performing the Singular Value Decomposition SVD of the built Toeplitz matrix A according to the previous formula (17).

Taking the smallest possible right singular vector $a=[a_0, a_1, \ldots, a_k]^T$, i.e. the column of V with the smallest possible singular value Forming a K-th-order polynomial whose coefficients are elements of a. The K zeros or roots of this polynomial lie directly on the complex exponential frequency of (12).

Forming a list of 2π-normalized frequencies by taking the complex angles of these roots.

Obtaining the values $\{t_k\}_{k=1}^{K}$ by multiplying this list by $$\frac{NT}{2\pi}$$

Obtaining the values $\{c_k\}_{k=1}^{K}$ by the least-square solution of (12).

In one embodiment the means for low-pass filtering comprise a hardware-implemented low-pass filter or a software-implemented low-pass filter.

In one embodiment the means for sampling comprise a hardware-implemented sampler or a software-implemented sampler.

In one embodiment the means for retrieving comprise at least one processor, such as one or more digital signal processors (DSPs), general purpose microprocessors, application specific integrated circuits (ASICs), field programmable logic arrays (FPGAs), or other equivalent integrated or discrete logic circuitry.

In one or more examples, the functions described may be implemented in hardware, software, firmware, or any combination thereof. If implemented in software, the functions may be stored on or transmitted over as one or more instructions or code on a computer-readable medium. Computer-readable media may includes computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

It is to be understood that the claims are not limited to the precise configuration and components illustrated above. Various modifications, changes and variations may be made in the arrangement, operation and details of the methods and apparatus described above without departing from the scope of the claims.

APPENDIX A

Proof of the Form of the Discrete-Time Fourier Transform of the Discrete-Time Filtering Operation Between the Input Sampled Signal and the Output Sampled Signal The specification of the low-pass filter in (6) guarantees that there is no aliasing in the sampling process. Consequently, the discrete-time Fourier transform of $x_T[n]$ can be obtained as $$X_T(e^{j\omega}) = \frac{1}{T}X\left(\frac{\omega}{T} + \Omega_0\right)|\omega| \le \pi \qquad (A1)$$

where $X(\Omega)$ denotes the continuous-time Fourier transform of $x(t)$. Similarly for $y_T[n]$ $$Y_T(e^{j\omega}) = \frac{1}{T}Y\left(\frac{\omega}{T} + \Omega_0\right) = \frac{1}{T}X\left(\frac{\omega}{T} + \Omega_0\right)H\left(\frac{\omega}{T} + \Omega_0\right) \qquad (A2)$$

$$|\omega| \le \pi$$

where $H(\Omega)$ denotes the Fourier transform of $h(t)$. From the definition of $h(t)$ in (1)

$$H(\Omega) = \sum_{k=1}^{K} c_k e^{-j\Omega t_k} \qquad (A3)$$

Substituting the above equality (A3) into (A2) and comparing with (A1) it is possible to verify that $$Y_T(e^{j\omega}) = X_T(e^{j\omega})H_T(e^{j\omega})$$

where $H_T(e^{j\omega})$ is as defined in (9).

APPENDIX B

Proof of the Complete Determination of the Original Continuous-Time Sparse Channel $h(t)$ by Using the Sampled Discrete-Time Channel $h_T[n]$ as Specified in (9)

On one hand the parameters $\{c_k\}_{k=1}^{K}$ and $\{t_k\}_{k=1}^{K}$ from (9) clearly determine the original continuous-time sparse channel $h(t)$. On the other hand, it is known from harmonic retrieval that these parameters can be uniquely determined from at least $2K$ values of $H_T(e^{j\omega})$, with a variety of methods available for that purpose.

The invention claimed is:
1. A method for adaptively learning a sparse impulse response of a continuous channel to which an input signal is applied and which delivers an output signal, comprising the following steps:
   low-pass filtering said input signal and said output signal and obtaining a filtered input signal and a filtered output signal, characterised in that, the method further comprises the steps of,
   sampling said filtered input signal and said filtered output signal with a sampling rate below the Nyquist rate and obtaining a sampled input signal and a sampled output signal
   retrieving from said sampled input signal and said sampled output signal an estimate of said sparse impulse response of said continuous channel, wherein said retrieving comprises modelling said estimate in the frequency domain as a filter comprising a sum of complex exponentials by carrying out a frequency domain least mean squares (FLMS) estimation of filter frequency values and using a Singular Value Decomposition (SVD) projection algorithm which exploits a low-rank structure of the filter to accelerate convergence of the frequency domain least mean squares (FLMS) estimation.

2. The method of claim 1, further comprising
frequency modulating said input signal and said output signal and obtaining a frequency modulated input signal and a frequency modulated output signal.

3. The method of claim 1, wherein said retrieving is based on frequency least mean square filtering.

4. The method of claim 2, further comprising
changing the modulation frequency for selecting a band of said input signal with the highest possible signal to noise ratio.

5. The method of claim 4, wherein said retrieving comprises
approximating said filter by an FIR filter of a finite length and obtaining a truncated filter
applying to said truncated filter a discrete Fourier transform and obtaining a transformed truncated filter
approximating said transformed truncated filter by a discretized version in the frequency domain of said continuous-time channel.

6. The method of claim 5, wherein said finite length is given by the formula $$N \geq \left\lceil \frac{\max_k (t_k)}{T} \right\rceil + c$$

where $t_k$ is a parameter of said continuous-time channel, T is said sampling rate and c is a constant.

7. The method of claim 5, further comprising
finding a standard update vector and adding it to a current estimate of said discretized version in the frequency domain of said continuous-time channel
calculating a next estimate by adding said standard update vector to said current estimate
forming a Toeplitz matrix (A) from said next estimate
computing a first diagonal singular value decomposition matrix (A) of said Toeplitz matrix
building a second diagonal matrix (A') from said first diagonal singular value decomposition matrix (A) by zerogoing all term less than the K most significative, where K is the sparsity of the continuous channel,
producing a new matrix (A') by using said built diagonal matrix, according to $A'=U\Lambda'V^T$ wherein said new matrix being of rank K, where K is the sparsity of said continuous channel, and wherein U is an unitary matrix, A is a diagonal matrix and $V^T$ is a conjugate transpose matrix of a unitary matrix;
computing a denoised version of said next estimate by averaging the diagonals of said new matrix
updating said next estimate by taking into account said denoised version wherein said updating of said next estimate comprises computing said next estimate by using the formula $$\hat{H}_{n+1} = \hat{H}_n + S + \left(I - \frac{SS^H}{S^H S}\right)(C - \hat{H}_n)$$

wherein $\hat{H}_{n+1}$ is said next estimate, is $\hat{H}$ said current estimate, C is said denoised version and S is said standard update vector.

8. The method of claim 7, further comprising
from said next estimates forming a Toeplitz matrix
performing the Singular Value Decomposition of the built Toeplitz matrix A
taking the smallest possible right singular vector of the last matrix of said Singular Value Decomposition
forming a K-th-order polynomial whose coefficients are elements of said singular vector, where K is the sparsity of said continuous-time channel,
forming a list of $2\pi$-normalized frequencies by taking the complex angles of the roots of said polynomial
obtaining parameter values ($c_k$ and $t_k$) of said continuous-time channel, which can be used for reconstructing the original continuous-time sparse impulse response h(t), by using said list.

9. The method of claim 1, said continuous-time channel being a wireless RF channel.

10. The method of claim 1, said input signal and said output signal being electromagnetic signals.

11. The method of claim 2, said frequency modulation being applied with a frequency modulator.

12. The method of claim 1, said filtering being made with an electrical or software filter.

13. A computer-readable storage medium for adaptively learning a sparse impulse response of a continuous channel to which an input signal is applied and which delivers an output signal, encoded with instructions for causing a programmable processor to
low-pass filter said input signal and said output signal and obtain a filtered input signal ($x_F(t)$) and a filtered output signal ($y_F(t)$), characterised in that, the instructions further cause a programmable processor to,
sample said filtered input signal ($x_F(t)$) and said filtered output signal ($y_F(t)$) with a sampling rate below the Nyquist rate and obtain a sampled input signal ($x_S(t)$) and a sampled output signal ($y_S(t)$)
retrieve from said sampled input signal ($x_S(t)$) and said sampled output signal ($y_S(t)$) an estimate of said sparse impulse response of said continuous channel, by, modelling said estimate in the frequency domain as a filter comprising a sum of complex exponentials by carrying out a frequency domain least mean squares (FLMS) estimation of filter frequency values, and using a Singular Value Decomposition (SVD) projection algorithm which exploits a low-rank structure of the filter to accelerate convergence of the frequency domain least mean squares (FLMS) estimation.

14. An apparatus for adaptive learning a sparse impulse response of a continuous channel having an input signal and an output signal comprising:
means for low-pass filtering said input signal and said output signal and obtaining a filtered input signal and a filtered output signal, characterised in that, the apparatus further comprises,
means for sampling said filtered input signal and said filtered output signal with a sampling rate below the Nyquist rate and obtaining a sampled input signal and a sampled output signal
means for retrieving from said sampled input signal and said sampled output signal an estimate of said sparse impulse response of said continuous channel, by, modeling said estimate in the frequency domain as a filter comprising a sum of complex exponentials by carrying out a frequency domain least mean squares (FLMS) estimation of filter frequency values, and using a Singular Value Decomposition (SVD) projection algorithm which exploits a low-rank structure of the filter to accelerate convergence of the frequency domain least mean squares (FLMS) estimation.

15. The apparatus according to claim 14 wherein,
the means for low-pass filtering said input signal and said output signal and obtaining a filtered input signal and a filtered output signal, is a low-pass filter arranged to low-pass filter said input signal and said output signal and obtain a filtered input signal and a filtered output signal
the means for sampling said filtered input signal and said filtered output signal with a sampling rate below the Nyquist rate and obtaining a sampled input signal and a sampled output signal, is a sampler arranged to sample said filtered input signal and said filtered output signal with a sampling rate below the Nyquist rate and obtain a sampled input signal and a sampled output signal
the means for retrieving from said sampled input signal and said sampled output signal an estimate of said sparse impulse response of said continuous channel, by, modelling said estimate in the frequency domain as a filter comprising a sum of complex exponentials by carrying out a frequency domain least mean squares (FLMS) estimation of filter frequency values, and using a Singular Value Decomposition (SVD) projection algorithm which exploits a low-rank structure of the filter to accelerate convergence of the frequency domain least mean squares (FLMS) estimation, is a calculator arranged to retrieve from said sampled input signal and said sampled output signal an estimate of said sparse impulse response of said continuous channel and arranged to model said estimate in the frequency domain as a filter comprising a sum of complex exponentials by carrying out a frequency domain least mean squares (FLMS) estimation of filter frequency values and using a SVD projection algorithm which exploits a low-rank structure of the filter to accelerate convergence of the frequency domain least mean squares (FLMS) estimation.

16. An apparatus for adaptively learning a sparse impulse response of a continuous channel to which an input signal is applied and which delivers an output signal, the apparatus comprising a processor configured to:
low-pass filter said input signal and said output signal and obtain a filtered input signal ($x_F(t)$) and a filtered output signal ($y_F(t)$), characterised in that, the instructions further cause a programmable processor to,
sample said filtered input signal ($x_F(t)$) and said filtered output signal ($y_F(t)$) with a sampling rate below the Nyquist rate and obtain a sampled input signal ($x_S(t)$) and a sampled output signal ($y_S(t)$)
retrieve from said sampled input signal ($x_S(t)$) and said sampled output signal ($y_S(t)$) an estimate of said sparse impulse response of said continuous channel, by, modelling said estimate in the frequency domain as a filter comprising a sum of complex exponentials by carrying out a frequency domain least mean squares (FLMS) estimation of filter frequency values, and using a Singular Value Decomposition (SVD) projection algorithm which exploits a low-rank structure of the filter to accelerate convergence of the frequency domain least mean squares (FLMS) estimation.

17. The apparatus of claim 16, further comprising a radio-transmitter, said radio-transmitter comprising one or more circuits configured to transmit said input signal and receive said output signal.

18. The apparatus of claim 17, said radio-transmitter being a mobile phone.

19. The apparatus of claim 16, said apparatus comprising one or more circuits configured to cancel the acoustic echo from said continuous-time channel.

20. The apparatus of claim 16, said apparatus comprising one or more circuits configured to cancel the line echo from said continuous-time channel.

21. A method of adaptively learning a sparse impulse response of a continuous channel to which an input signal is applied and which delivers an output signal, comprising the following steps:
low-pass filtering said input signal and said output signal and obtaining a filtered input signal and a filtered output signal, characterised in that, the method further comprises the steps of,
sampling said filtered input signal and said filtered output signal with a sampling rate below the Nyquist rate and obtaining a sampled input signal and a sampled output signal
retrieving from said sampled input signal and said sampled output signal an estimate of said sparse impulse response of said continuous channel, wherein said retrieving comprises modelling said estimate in the frequency domain as a filter comprising a sum of complex exponentials by carrying out a frequency domain least mean squares (FLMS) estimation of filter frequency values and using a Singular Value Decomposition (SVD) projection algorithm which enforces sparsity constraints by exploiting a low-rank structure of Toeplitz matrices to accelerate convergence of the frequency domain least mean squares (FLMS) estimation.

* * * * *